Nov. 27, 1923.
W. O. HARMON
FOOT SCRAPER
Filed Feb. 26, 1923
1,475,818
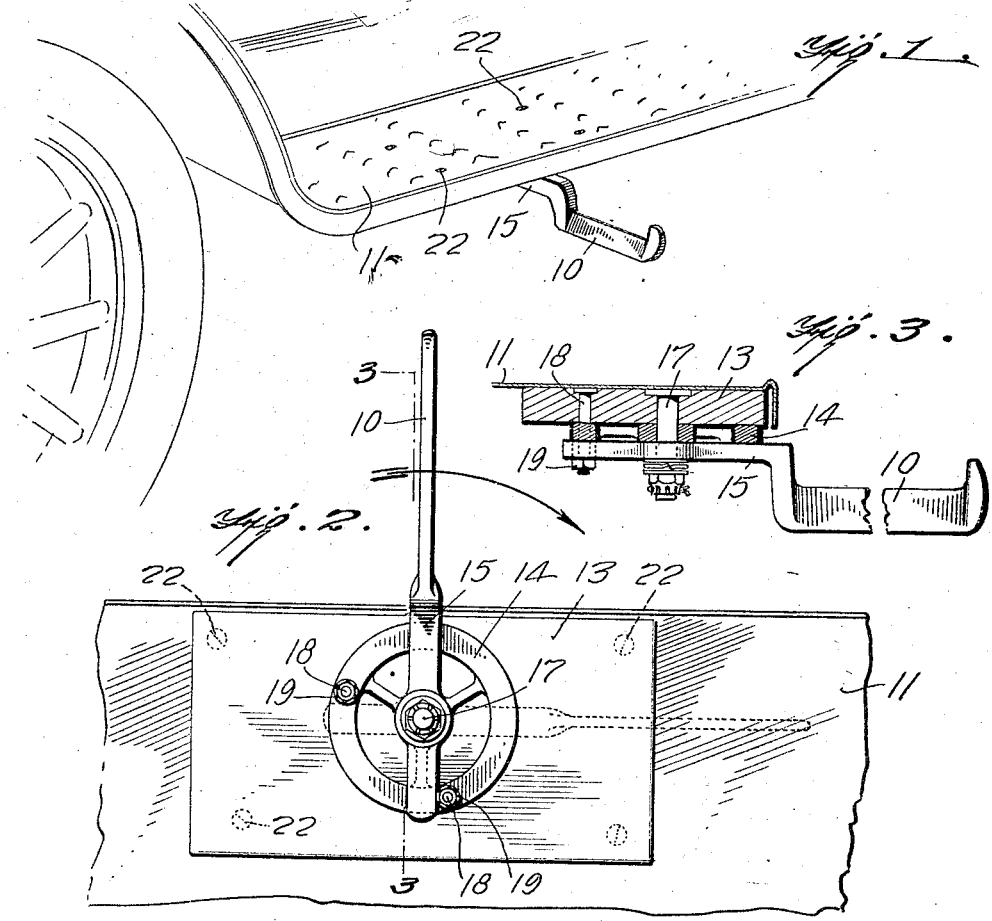
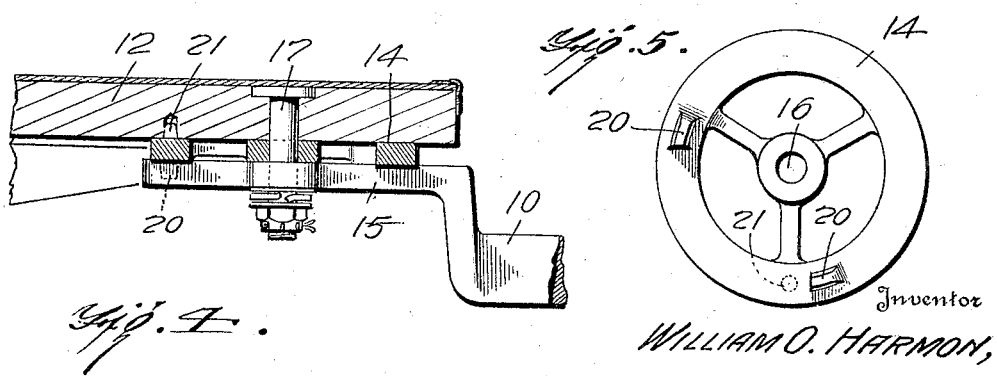
Inventor
WILLIAM O. HARMON,
By Franklin H. Hough
Attorney Patented Nov. 27, 1923.

1,475,818

UNITED STATES PATENT OFFICE.

WILLIAM O. HARMON, OF LA PRYOR, TEXAS.

FOOT SCRAPER.

Application filed February 26, 1923. Serial No. 621,260.

*To all whom it may concern:*

Be it known that WILLIAM O. HARMON, a citizen of the United States, residing at La Pryor, in the county of Zavalla and State of Texas, has invented certain new and useful Improvements in Foot Scrapers; and he does hereby declare the following to be a full, clear, and exact description of the invention, such as will enable others, skilled in the art to which it appertains, to make and use the same, reference being had to the accompanying drawings, and to the letters and figures of reference marked thereon, which form a part of this specification.

This invention relates to foot scrapers for automotive vehicles and the like and has for an object to provide a device of the kind which may be readily and conveniently attached to and beneath the running-board of such a vehicle, to be folded under the running-board for transportation and to be folded outwardly for use. A further object of the invention is to provide improved means for attaching the scraper element to the running-board. With these and other objects in view, the invention comprises certain novel elements, units, parts, combinations, functions and interactions as disclosed in the drawings, together with mechanical equivalents thereof, as will be hereinafter more fully described and claimed.

In the drawings:

Figure 1 is a perspective view of a conventional running-board with the scraper attached thereto and swung outwardly in operative position;

Figure 2 is an inverted plan view, showing the attachment to the running-board, the scraper being swung outwardly to operative position in full lines and inwardly to carrying position in dotted lines;

Figure 3 is a transverse sectional view taken on line 3—3 of Figure 2;

Figure 4 is an enlarged detail sectional view, showing a modification as required by running-boards of different types;

Figure 5 is an inverted plan view of the limiting washer.

Like characters of reference indicate corresponding parts throughout the several views.

The present invention comprises a foot scraper, element 10, with means for attaching to the running-board of an automotive vehicle, with improved means for accomplishing the swinging of the scraper out of operative position under the running-board for carrying purposes and outwardly for use. It is well-known that different types of automotive vehicles have running-boards of different types, some composed merely of metal, as indicated at 11, while others are provided with a wooden or equivalent running-board, as indicated at 12. For use with the running-board employing only the metal running-board, a wooden or equivalent block, 13, is used as a part of the present invention; but when employed upon the running-board embodying the wooden board, as shown at 12, this block, 13, is not employed. The washer, 14, is secured either directly to the wooden running-board 12 or to the block 13, according as the block is or is not used. This washer 14 is of such proportion and contour that the arm 15, formed preferably integral with the scraper element 10, bears upon the periphery of the washer upon both sides of the fulcrum point, 16. As a pintle for the fulcrum, a bolt, 17, is employed which extends through either the block 13 or the board, 12, according to the type of running-board, and also through the center opening of the washer 14.

Preferably this washer, 14, will be secured to the block 13 or board 12 by means of bolts 18, carrying nuts 19, properly positioned to limit the swinging movement of the arm 15 about its fulcrum, serving therefore the double purpose of securing the washer more firmly to the wooden element and that of stop for the swinging of the scraper element. In some cases, however, these bolts 18 with their nuts 19 may be eliminated by forming stops 20 directly upon the under side of the washer 14 with a stud, 21, entering a socket in the under side of the board, simply for the purpose of preventing rotation of the washer, the washer being maintained in its normal or required position by the bolt, 17.

In case the block 13 is employed, the block itself is secured to the running-board, 11, as by screws 22. It will be obvious that for ordinary carrying, when the scraper is not required for use, it will be swung beneath the running-board to the dotted line position shown at Figure 1. When it is required for use, it is swung outwardly as indicated in full lines in the drawings. It is maintained always against rattling and swinging when not required by the frictional engagement of the arm 15 with the periphery of the washer 14, such friction also tending to hold the scraper when in operative position against swinging when in use.

What I claim is:

1. A foot-scraper installation comprising a scraper element, an extended arm, a washer proportioned to be engaged by the arm at spaced points, a fulcrum pivoting the arm intermediate said spaced points, and means to attach the washer to the under side of a running-board.

2. A foot-scraper installation comprising a scraper element, an arm extension from such element provided with a fulcrum point, a circular washer having its centre coinciding with the fulcrum point and its periphery engaging the arm upon opposite sides of said fulcrum point, means to secure the washer to the under side of a running-board and stops carried by the washer for limiting the swinging movement of the scraper element, both in its inward and outward position.

In testimony whereof he hereunto affixes his signature.

WILLIAM O. HARMON.